US007543970B2

(12) United States Patent  
Kiyohara et al.

(10) Patent No.: US 7,543,970 B2  
(45) Date of Patent: Jun. 9, 2009

(54) FLAT LIGHT SOURCE

(75) Inventors: Toru Kiyohara, Kumamoto (JP); Toshiyuki Yoneda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/759,637

(22) Filed: Jun. 7, 2007

(65) Prior Publication Data

US 2007/0285944 A1 Dec. 13, 2007

(30) Foreign Application Priority Data

Jun. 9, 2006 (JP) .............................. 2006-160815

(51) Int. Cl.
  *F21V 7/04* (2006.01)
(52) U.S. Cl. .................... 362/612; 362/561; 362/632
(58) Field of Classification Search .................... 362/26, 362/248, 555, 561, 606, 608, 609, 610, 612, 362/613, 615, 618, 633, 800; 349/58, 59, 349/62, 65, 69; 257/E33.057, 33.072
See application file for complete search history.

(56) References Cited

U.S. PATENT DOCUMENTS

| 5,280,372 | A * | 1/1994 | Horiuchi ....................... 349/65 |
| 6,611,304 | B2 * | 8/2003 | Itoh et al. ....................... 349/65 |
| 6,634,761 | B2 * | 10/2003 | Ichikawa ....................... 362/600 |
| 7,157,853 | B2 * | 1/2007 | Imai et al. ....................... 313/512 |
| 7,237,938 | B2 * | 7/2007 | Wang et al. ....................... 362/612 |
| 7,287,896 | B2 * | 10/2007 | Okamoto et al. ............. 362/634 |
| 2005/0141244 | A1 | 6/2005 | Hamada et al. |
| 2006/0056200 | A1 * | 3/2006 | Yamashita et al. ........... 362/620 |
| 2007/0153539 | A1 * | 7/2007 | Mikami ....................... 362/561 |
| 2007/0171673 | A1 * | 7/2007 | Song et al. ................... 362/612 |

FOREIGN PATENT DOCUMENTS

| JP | 9-185055 | 7/1997 |
| JP | 2002-324423 | 11/2002 |
| JP | 2004-253308 | 9/2004 |
| JP | 2005-79038 | 3/2005 |
| JP | 2005-243533 | 9/2005 |
| JP | 2005-347109 | 12/2005 |
| KR | 10-2006-0028895 | 4/2006 |

* cited by examiner

*Primary Examiner*—Hargobind S Sawhney  
(74) *Attorney, Agent, or Firm*—Oblon, Spivak, McClelland, Maier & Neustadt, P.C.

(57) ABSTRACT

Each point light source includes an overhang projecting perpendicularly to a light emitting surface from one side of the light emitting surface, and the overhang has its main surface made in contact with a light outgoing surface of a light guide plate with the light emitting surface facing a light incident surface of the light guide plate. Engagement of the overhang with the light outgoing surface of the light guide plate prevents a displacement of the light emitting surface of the point light source and the light incident surface of the light guide plate even when the light guide plate suffers from deformation such as warpage. Even if a displacement occurs, the presence of the overhang reflects leaked light to guide it to the light incident surface of the light guide plate.

3 Claims, 7 Drawing Sheets

FLAT LIGHT SOURCE

FIELD OF THE INVENTION

The present invention relates to a flat light source, and more particularly to a flat light source for use in a liquid crystal display apparatus.

DESCRIPTION OF THE BACKGROUND ART

A typical liquid crystal display apparatus includes a liquid crystal panel and a flat light source, which is provided on the rear surface of the liquid crystal panel. The flat light source includes the sidelight type and the direct-light type depending on how the light source is disposed.

A flat light source of the sidelight type (also called edge-light type) has its light sources disposed in a crystal liquid display near the side surface of the liquid crystal display apparatus, while a flat light source of the direct-light type has its light sources disposed to face the rear surface of the liquid crystal panel.

There is a sidelight type flat light source employing a light guide plate which receives light from the light sources and diffuses the light therein to supply uniform light to the rear surface of the liquid crystal panel.

In a flat light source employing such a light guide plate, light emitted from a sidelight part having line sources such as cold cathode fluorescent lamps (CCFL) or point light sources such as light emitting diodes (LED) is reflected in the light guide plate and diffused in a diffusion pattern made on the light guide plate, so that area light is obtained from the main surface of the light guide plate.

In this respect, Japanese Patent Application Laid-Open No. 2005-79038, for example, discloses a sidelight type flat light source employing point light sources such as LEDs each having its light emitting surface made in contact with the light incident surface of a light guide plate.

In the flat light source of such construction, light emitted from a light emitting region of each point light source effectively enters the light guide plate, which can avoid losses in incidence efficiency upon the light guide plate.

In contrast, when warpage occurs in the light guide plate, the light emitting region of each point light source is displaced from the light incident surface of the light guide plate, resulting in decreased incidence efficiency and degraded display quality.

Japanese Patent Application Laid-Open No. 2005-243533, for example, discloses preventing decrease in incidence efficiency due to warpage of the light guide plate by providing projections on the light guide plate to be engaged with an enclosure.

With such construction, however, problems of decreased incidence efficiency and degraded display quality still arise when the light emitting region of each point light source is displaced from the light incident surface of the light guide plate.

Further, the enclosure needs to have rigidity to compensate for warpage of the light guide plate, which causes problems of size increase of the liquid crystal display apparatus and construction difficulty. Furthermore, when engaging the light guide plate with the enclosure, they rub against each other to generate foreign matters, which results in display failure.

SUMMARY OF THE INVENTION

An object of the present invention is to provide a flat light source achieving easy construction while preventing decrease in incidence efficiency and degradation in display quality due to a displacement of a light emitting region of each point light source from a light incident surface of a light guide plate, with each point light source disposed such that a light emitting surface thereof is in contact with the light incident surface of the light guide plate.

According to a first aspect of the present invention, the flat light source includes a flat light guide plate having one main surface serving as a light outgoing surface from which light outgoes and the other main surface serving as a reflection surface opposite to the light outgoing surface, and point light sources provided at least on one side surface of the light guide plate. The one side surface of the light guide plate on which the point light sources are provided serves as a light incident surface. Each of the point light sources includes a block-like body with a light source stored therein, one surface of the body serving as a light emitting surface at which a light emitting part of the light source is exposed, each of the point light sources at least including a first overhang projecting from one side of the light emitting surface perpendicularly to the light emitting surface. The first overhang has its main surface being in contact with one of the light outgoing surface and the reflection surface with the point light sources disposed such that the light emitting surface faces the light incident surface.

The first overhang is in contact with the light outgoing surface with each point light source provided such that the light emitting surface faces the light incident surface, which prevents a displacement of each point light source and the light guide plate from each other due to warpage of the light guide plate, and allows most of the light emitted from each point light source to enter the light incident surface of the light guide plate. Accordingly, light emitted from each point light source is used effectively to prevent degradation in luminance of the flat light source and fluctuations in luminance in the light outgoing surface.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Preferred Embodiment

A-1. Device Construction

A flat light source according to a first preferred embodiment of the present invention will be described with reference to FIGS. 1 through 14.

Figure 1:
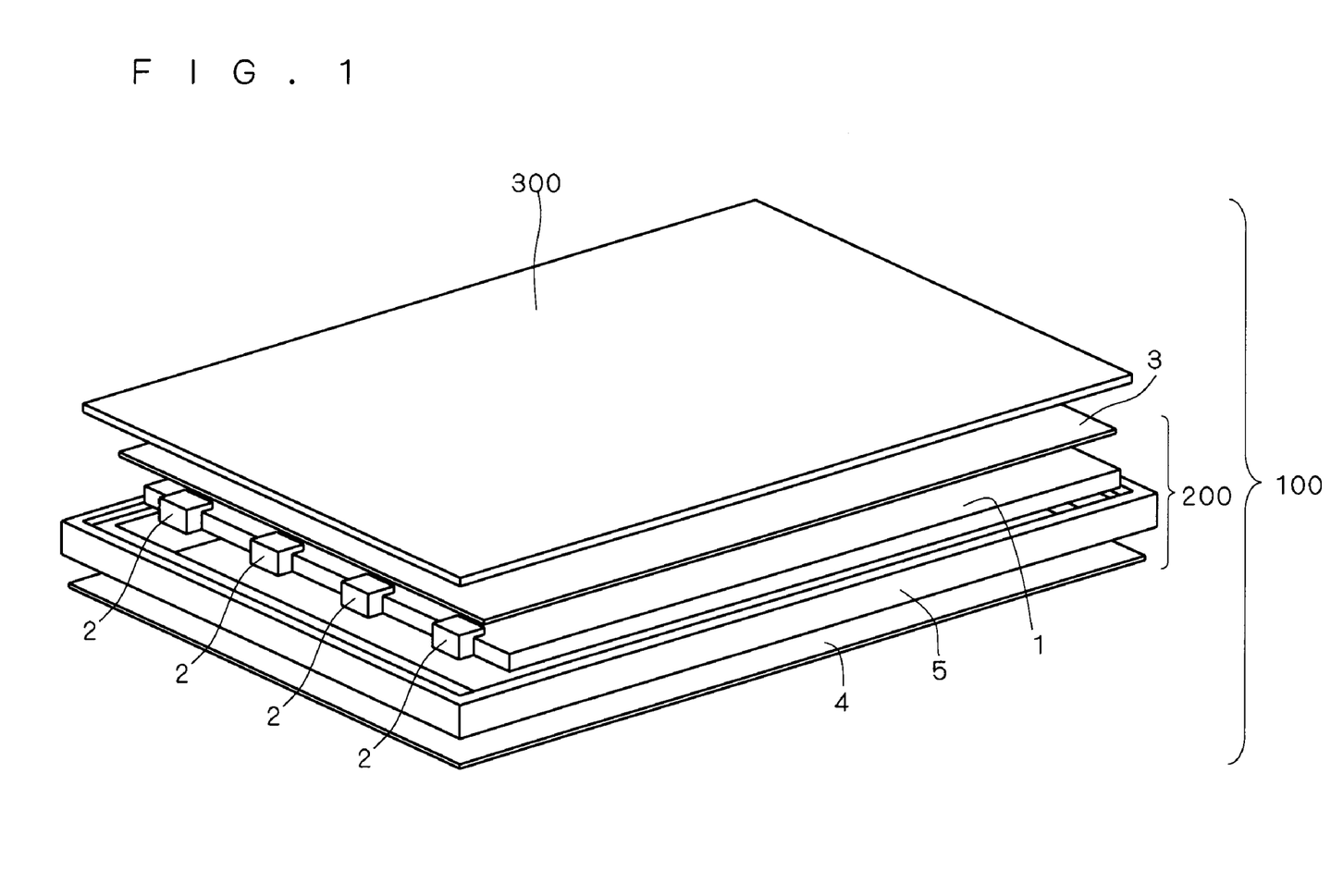
FIG. 1 is a perspective view showing the construction of a liquid crystal display apparatus including a flat light source according to a first preferred embodiment of the present invention.
Figure 2:
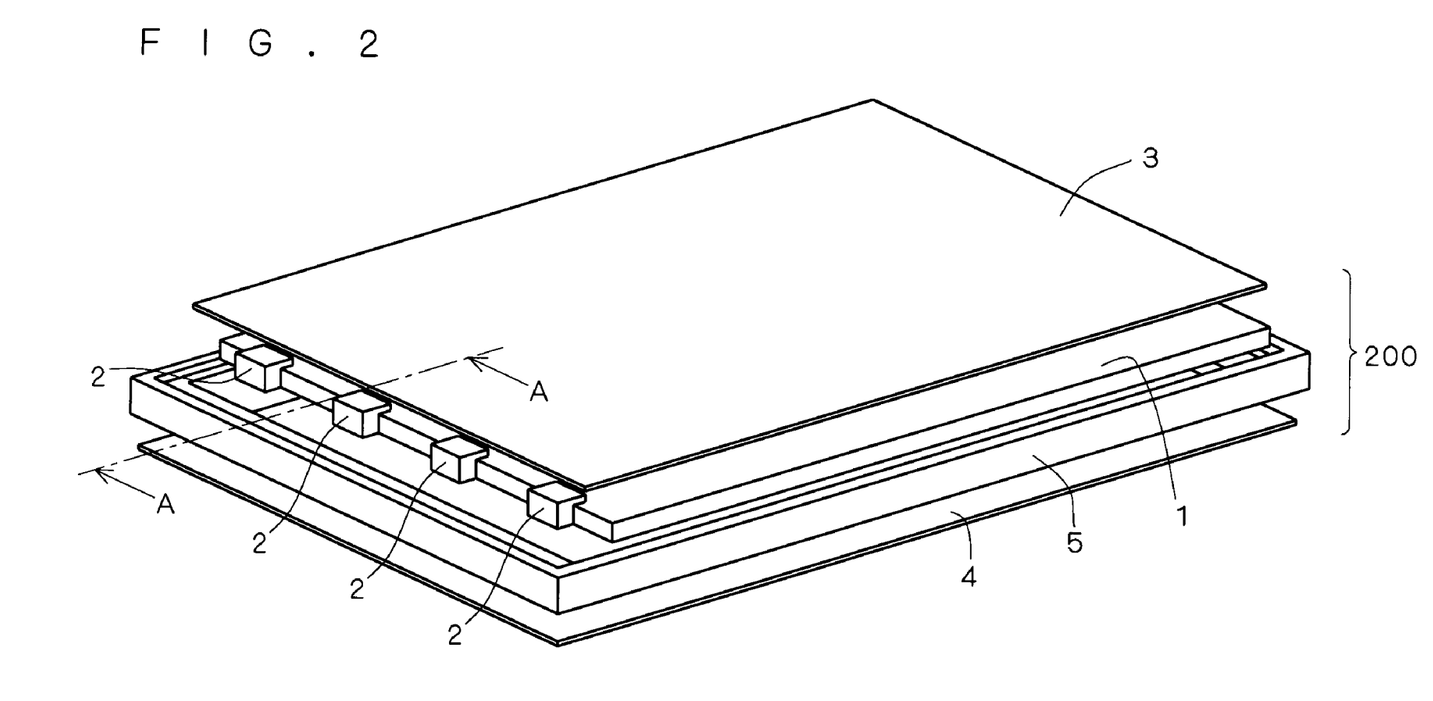
FIG. 2 is a perspective view showing the construction of the flat light source according to the first preferred embodiment.

FIG. 1 is a perspective view showing the construction of a liquid crystal display apparatus 100 provided with a flat light source 200 according to the present embodiment. FIG. 2 is a perspective view showing the construction of the flat light source 200, and FIG. 3 is a sectional view showing the flat light source 200 viewed in the direction of the arrow A.

As shown in FIG. 1, the liquid crystal display apparatus 100 is provided with a liquid crystal panel 300 and the flat light source 200 disposed on the rear surface of the liquid crystal panel 300.

The flat light source 200 includes a light guide plate 1, a plurality of point light sources 2 attached to at least one side surface of the four side surfaces of the light guide plate 1, an enclosure 5 for storing the light guide plate 1 with the point light sources 2 attached thereto, an optical sheet 3 covering one main surface (light outgoing surface) of the light guide plate 1 that faces the liquid crystal panel 300, and a reflection sheet 4 covering the other main surface (reflection surface) of the light guide plate 1 opposite to the liquid crystal panel 300.

Figure 3:
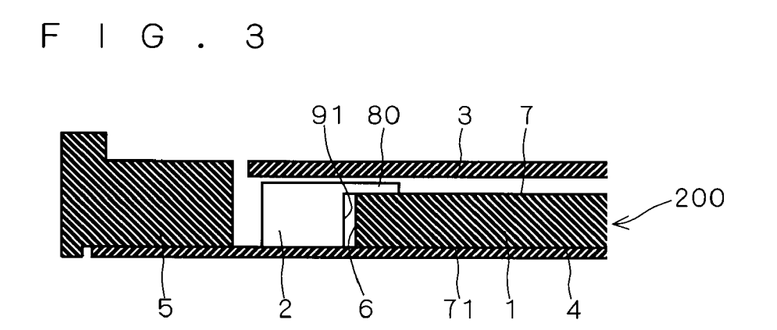
FIG. 3 is a partial sectional view showing the construction of the flat light source according to the first preferred embodiment.

The light guide plate 1 is made of transparent acryl resin or the like, and as shown in FIG. 3, has a light incident surface 6 to which the point light sources 2 are attached and upon which light from the point light sources 2 is made incident and a light outgoing surface 7 which is the main surface opposite to the liquid crystal panel 300 and from which incident light outgoes.

Either the light outgoing surface 7 or the reflection surface 71 opposite to the light outgoing surface 7 typically has a dot pattern and prism formed thereon. With their presence, light incident upon the light incident surface 6 is scattered and spread, which outgoes from substantially the whole surface of the light outgoing surface 7.

The optical sheet 3 is capable of changing the direction of travel of light outgoing from the light outgoing surface 7 of the light guide plate 1 so as to approach the direction of normal to the display surface of the liquid crystal panel 300, to thereby achieve improved luminance.

The point light sources 2 are mounted on a flexible printed circuit (FPC) not shown, and they receive power through the FPC. Employed as a light source for the point light sources 2 is a side view type white LED which emits light substantially horizontally to the mounting surface.

Light emitted from the point light sources 2 enters the side surface of the light guide plate 1 and propagates in the light guide plate 1 to outgo from the light outgoing surface 7. At this time, light propagating toward the reflection surface 71 of the light guide plate 1 is reflected toward the light outgoing surface 7 by the reflection sheet 4 since the reflection surface 71 of the light guide plate 1 is covered by the reflection sheet 4.

As shown in FIG. 1, the liquid crystal panel 300 is provided on the light outgoing surface 7 of the flat light source 200 of the above construction so as to cover the flat light source 200 as a whole, and light outgoing from the light outgoing surface 7 enters the liquid crystal panel 300 through the optical sheet 3, so that uniform light is supplied to the liquid crystal panel 300.

One of a diffusion sheet, a prism sheet and a polarizing reflection sheet, etc. or a combination of some of them may be used as the optical sheet 3. The optical sheet 3 is not an essential component, and may be omitted.

It is preferable to use a reflection sheet 4 of high reflectance, as a matter of course. While the reflection sheet 4 is disposed under the enclosure 5 in FIG. 3, this is not a restrictive example, but the reflection sheet 4 may be stored in the enclosure 5.

The enclosure 5 is generally made of synthetic resin such as polycarbonate (PC) or acrylonitrile butadiene styrene (ABS), but it may be made of a material of high reflectance or a white coating or the like may be applied thereto so as to reduce losses of light emitted from the light source.

The liquid crystal panel 300 receives a video signal through an FPC or TCP (tape carrier package) not shown. Light, supplied to the liquid crystal panel 300 is modulated in accordance with the video signal, so that a plurality of colors are displayed through color filters of R (red), G (green) and B (blue).

Figure 4:
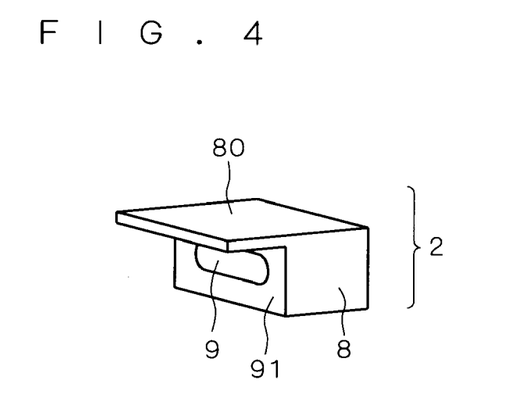
FIG. 4 is a perspective view showing the construction of a point light source of the flat light source according to the first preferred embodiment.

The construction of each point light source 2 will now be described with reference to FIGS. 3 and 4. FIG. 4 is a perspective view showing the construction of a point light source 2. As shown in the drawing, the point light source 2 has an LED stored in a block-like body 8 with a light emitting part 9 of the LED exposed at one surface of the body 8. This one surface will be called the light emitting surface 91. An overhang 80 projecting perpendicularly from the light emitting surface 91 is provided on one side of the light emitting surface 91.

As shown in FIG. 3, the overhang 80 has its main surface made in contact with the light outgoing surface 7 of the light guide plate 1 with the light emitting surface 91 facing the light incident surface 6 of the light guide plate 1. The one side of the light emitting surface 91 from which the overhang 80 projects will be called the upper side of the light emitting surface 91.

Also as shown in FIG. 3, the plurality of point light sources 2 and light guide plate 1 are provided in the frame-like enclosure 5 with the point light sources 2 disposed along the light incident surface 6 of the light guide plate 1.

Bringing the overhang 80 into engagement with the light outgoing surface 7 of the light guide plate 1 can prevent the light emitting surface 91 of each point light source 2 and the light incident surface 6 of the light guide plate 1 from being displaced from each other even when the light guide plate 1 suffers from deformation such as warpage. Even if a displacement occurs, the presence of the overhang 80 reflects leaked light to guide it to the light incident surface 6 of the light guide plate 1.

The overhang 80 may be made of a material of high reflectance (90% or higher in the visible region, preferably 95% or higher), or may be treated to obtain high reflectance by coating or evaporation. Herein, since the body 8 and overhang 80 are formed integrally, the material of the overhang 80 is determined by the material of the body 8 (resin, ceramics, aluminum, etc).

The light guide plate 1 may be made of polycarbonate or cycloolefin-based resin, rather than acryl resin. The use of polycarbonate or cycloolefin-based resin minimizes dimensional changes caused by temperature changes, and thus allows use in a wider temperature range.

A-2. Effects

As described above, in the flat light source according to the first preferred embodiment, each point light source 2 has the overhang 80 engaged with the light outgoing surface 7 of the light guide plate 1, which prevents a displacement of the point light source 2 and light guide plate 1 from each other due to warpage of the light guide plate 1, if any, and allows most of light emitted from each point light source 2 to enter the light incident surface 6 of the light guide plate 1. Accordingly, light emitted from the point light source 2 is used effectively to prevent degradation in luminance of the flat light source 200 and fluctuations in luminance in the light outgoing surface 7.

The plurality of point light sources 2 as mounted on an FPC are arranged along the light incident surface 6 of the light guide plate 1, as described earlier, and thus are not displaced or permitted to fall off individually. Even when the light guide plate 1 suffers from slight warpage, the point light sources 2 are capable of following such warpage, which prevents the point light source 2 and the light guide plate 1 from being displaced from each other. The overhang 80 is particularly effective when the light guide plate 1 suffers from warpage to a greater degree.

Securing the overhang 80 to the light guide plate 1 by an adhesive double-sided tape or the like can prevent the point light source 2 and the light guide plate 1 from being displaced from each other with more reliability.

A-3. First Variant

In the above-described flat light source 200 according to the first preferred embodiment, the portion of the light outgoing surface 7 of the light guide plate 1 with which the overhang 80 of each point light source 2 engages is on the same plane as another portion. Thus, the overhang 80 when brought into engagement with the light outgoing surface 7 extends off the light outgoing surface 7 by its thickness (not more than 1 mm, preferably not more than 0.5 mm) as shown in FIG. 3. This may cause a gap corresponding to the thickness of the overhang 80 between the light guide plate 1 and optical sheet 3.

Figure 5:
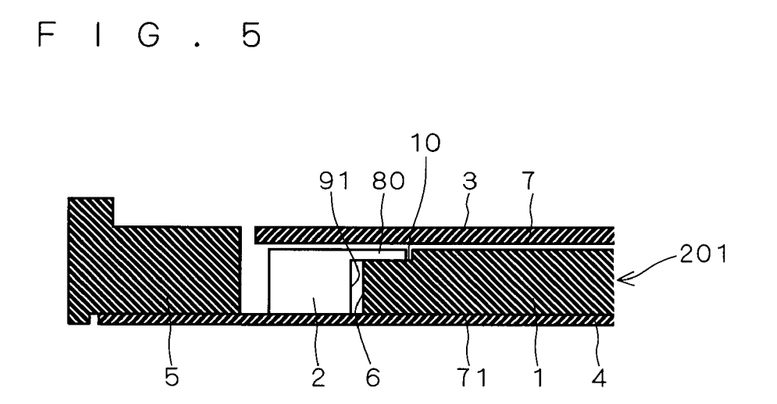
FIG. 5 is a partial sectional view showing the construction of a flat light source according to a first variant of the first preferred embodiment.

However, as in a flat light source 201 shown in FIG. 5, a recess 10 may be provided at the edge of the light outgoing surface 7 of the light guide plate 1 to be engaged with the overhang 80, to thereby prevent the occurrence of such a gap. In this case, the recess 10 is formed in a depth not less than the thickness of the overhang 80, which allows the overhang 80 to be held completely in the recess 10 so that the overhang 80 does not extend off the light outgoing surface 7. This minimizes the possibility that a gap might occur between the light guide plate 1 and the optical sheet 3. It also prevents propagating light that does not enter the light incident surface 6 of the light guide plate 1, of light emitted from each point light source 2, from entering the gap between the light guide plate 1 and the optical sheet 3, which prevents degradation in display quality.

Further, the flat light source 201 can be formed thinner since the overhang 80 does not extend off the light outgoing surface 7.

The recess 10 may be provided continuously in the direction that the light incident surface 6 extends to which the point light sources 2 are to be attached, or it may be provided locally on the light outgoing surface 7 at positions corresponding to prescribed mounting positions of the light incident surface 6 at which the point light sources 2 are to be attached.

A-4. Second Variant

Figure 6:
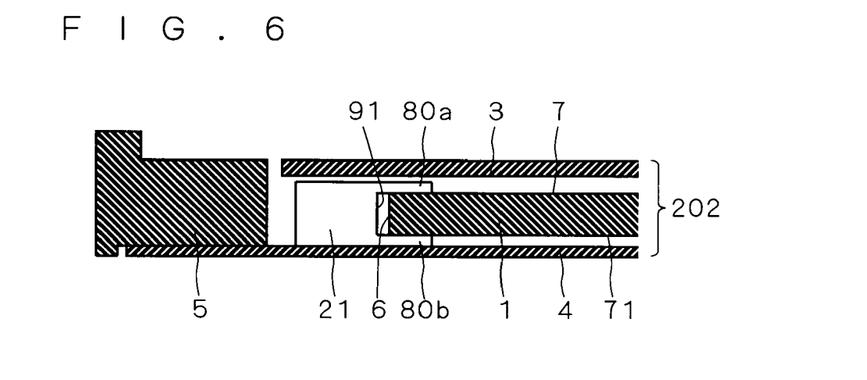
FIG. 6 is a partial sectional view showing the construction of a flat light source according to a second variant of the first preferred embodiment.

While in the flat light source 200 according to the first preferred embodiment, the overhang 80 of each point light source 2 engages with the light outgoing surface 7 of the light guide plate 1, overhangs 80a and 80b may be provided for each point light source 21 to engage with the light outgoing surface 7 and the opposite reflection surface 71 of the light guide plate 1, respectively, as in a flat light source 202 shown in FIG. 6.

Figure 7:
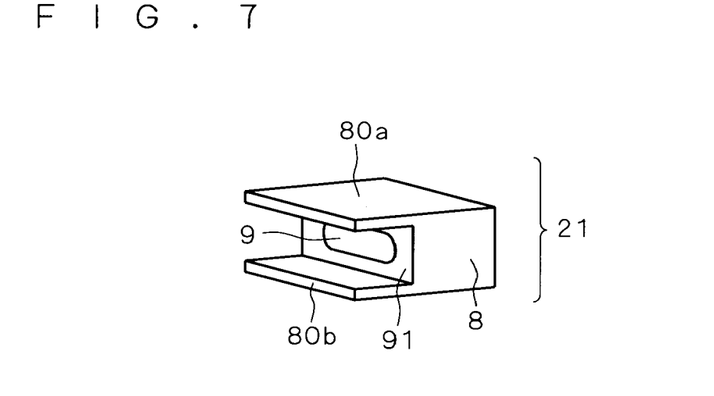
FIG. 7 is a perspective view showing the construction of a point light source of flat light source according to the second variant of the second preferred embodiment.

FIG. 7 is a perspective view showing the construction of the point light source 21. As shown in the drawing, the point light source 21 basically has a similar construction to the point light source 2 described with reference to FIGS. 3 and 4, except that the overhangs 80a and 80b project from a pair of two sides of the light emitting surface 91, respectively.

The overhang 80a has its main surface made in contact with the light outgoing surface 7 of the light guide plate 1, and the overhang 80b has its main surface made in contact with the reflection surface 71 of the light guide plate 1, with the light emitting surface 91 facing the light incident surface 6 of the light guide plate 1, as shown in FIG. 6.

The two sides of the light emitting surface 91 from which the overhangs 80a and 80b project will be called the upper and lower sides of the light emitting surface 91, respectively.

As described, bringing the overhangs 80a and 80b provided for each point light source 21 into engagement with the light outgoing surface 7 and the reflection surface 71 of the light guide plate 1, respectively, allows the point light source 21 to be held securely to the light guide plate 1, which prevents the point light source 21 and the light guide plate 1 from being displaced from each other.

Further, since most of light emitted from the point light source 21 is allowed to enter the light incident surface 6 of the light guide plate 1, light emitted from the point light source 21 is used effectively to prevent reduction in luminance of the flat light source 202 and fluctuations in luminance in the light outgoing surface 7.

A-5. Third Variant

In the above-described flat light source 202, the portion of the light outgoing surface 7 and the portion of the reflection surface 71 of the light guide plate 1 with which the overhangs 80a and 80b of each point light source 21 engage, respectively, are on the same plane as another portion. Thus, the overhang 80a when brought into engagement with the light outgoing surface 7 extends off the light outgoing surface 7 by its thickness (not more than 1 mm, preferably not more than 0.5 mm) as shown in FIG. 6, and the overhang 80b when brought into engagement with the reflection surface 71 extends off the reflection surface 71 by its thickness.

This may cause a gap corresponding to the thickness of the overhang 80a between the light guide plate 1 and the optical sheet 3 and a gap corresponding to the thickness of the overhang 80b between the light guide plate 1 and the reflection sheet 4.

Figure 8:
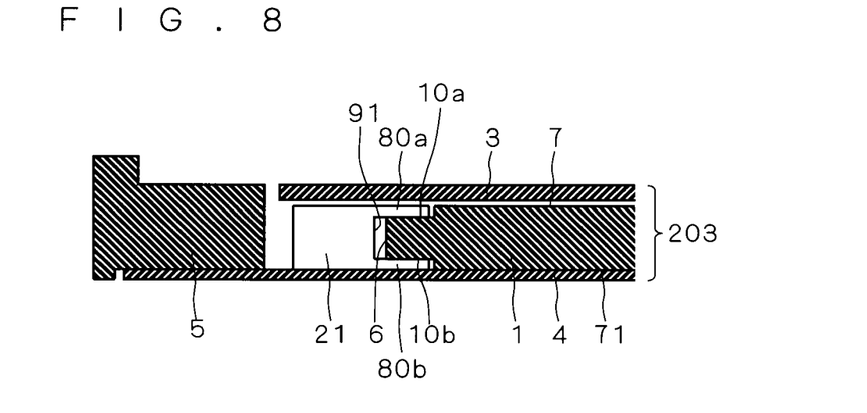
FIG. 8 is a partial sectional view showing the construction of the flat light source according to the second variant of the first preferred embodiment.

However, as a flat light source 203 shown in FIG. 8, a recess 10a may be provided at the edge of the light outgoing surface 7 of the light guide plate 1 to be engaged with the overhang 80a, and a recess 10b may be provided at the edge of the reflection surface 71 of the light guide plate 1 to be engaged with the overhang 80b, to thereby prevent the occurrence of such gaps.

In this case, the recesses 10a and 10b are formed in a depth not less than the thickness of the overhangs 80a and 80b, respectively, which allows the overhangs 80a and 80b to be held completely in the recesses 10a and 10b, respectively so that the overhangs 80a and 80b do not extend off the light outgoing surface 7 and the reflection surface 71, respectively.

This minimizes the possibility that gaps might occur between the light guide plate 1 and the optical sheet 3 and between the light guide plate 1 and the reflection sheet 4. It also prevents propagating light that does not enter the light incident surface 6 of the light guide plate 1, of light emitted from each point light source 21, from entering the gap between the light guide plate 1 and the optical sheet 3, which prevents degradation in display quality.

Further, the flat light source 203 can be formed thinner since the overhangs 80a and 80b do not extend off the light outgoing surface 7 and reflection surface 71, respectively.

The recesses 10a and 10b may be provided continuously in the direction that the light incident surface 6 extends to which the point light sources 21 are to be attached, or provided locally on the light outgoing surface 7 and the reflection surface 71, respectively, at positions corresponding to prescribed mounting positions of the light incident surface 6 at which the point light sources 21 are to be attached.

A-6. Fourth Variant

While it has been described that the overhang 80 of each point light source 2 engages with the light outgoing surface 7 of the light guide plate 1 in the flat light source 200 described with reference to FIG. 3 and flat light source 201 described with reference to FIG. 5, the overhang 80 may engage with the reflection surface 71, rather than the light outgoing surface 7 of the light guide plate 1.

Figure 9:
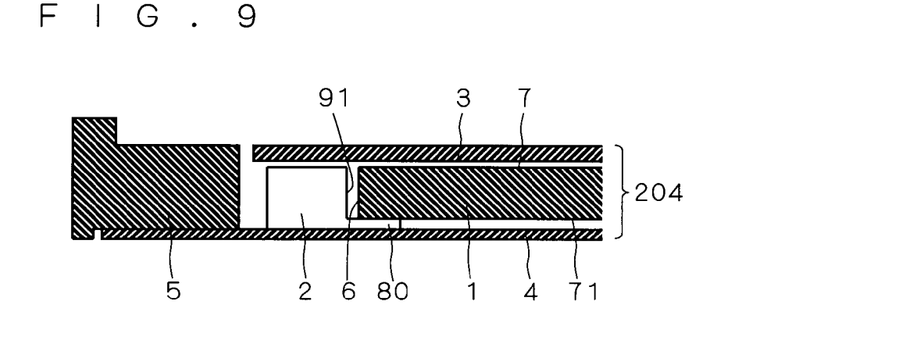
FIG. 9 is a partial sectional view showing the construction of a flat light source according to a third variant of the first preferred embodiment.

More specifically, in a flat light source 204 shown in FIG. 9, the overhang 80 has its main surface disposed to be in contact with the reflection surface 71 of the light guide plate 1. Herein, each point light source 2 is used upside down as compared to the application to the flat light source 200. When the point light source 2 cannot be disposed simply upside down in relation to the connection with an FPC, however, each point light source may be provided with an overhang 80 projecting from one side (the lower side) of the light emitting surface 91 to be applicable to the flat light source 204.

The flat light source 204 of such construction can also prevent a displacement of the point light source 2 and the light guide plate 1 from each other due to warpage of the light guide plate 1, if any, and allows most of light emitted from each point light source 2 to enter the light incident surface 6 of the light guide plate 1. Accordingly, light emitted from the point light source 2 is used effectively to prevent degradation in luminance of the flat light source 200 and fluctuations in luminance in the light outgoing surface 7.

A-7. Fifth variant

In the above-described flat light source 204, the portion of the reflection surface 71 of the light guide plate 1 with which the overhang 80 of each point light source 2 engages is on the same plane as another portion. Thus, the overhang 80 when brought into engagement with the reflection surface 71 extends off the reflection surface 71 by its thickness (not more than 1 mm, preferably not more than 0.5 mm) as shown in FIG. 9. This may cause a gap corresponding to the thickness of the overhang 80 between the light guide plate 1 and the reflection sheet 4.

Figure 10:
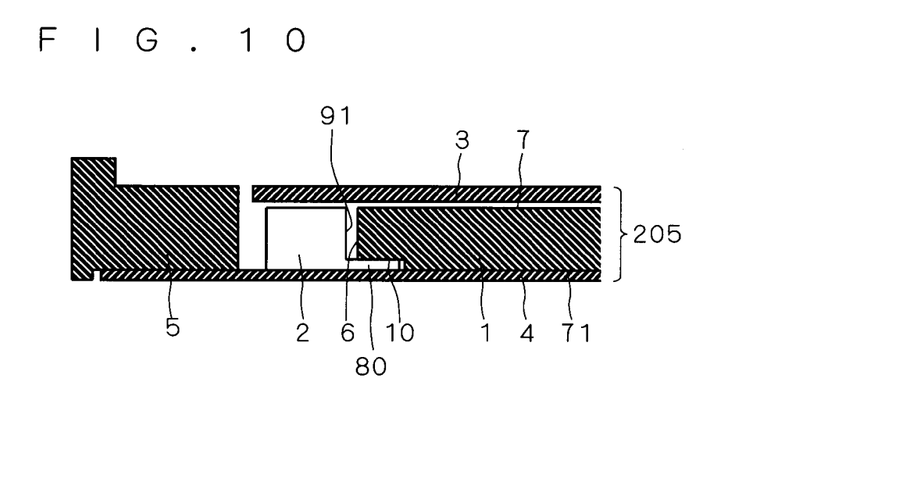
FIG. 10 is a partial sectional view showing the construction of a flat light source according to a fourth variant of the first preferred embodiment.

However, as in a flat light source 205 shown in FIG. 10, a recess 10 may be provided at the edge of the reflection surface 71 of the light guide plate 1 to be engaged with the overhang 80, to thereby prevent the occurrence of such a gap. In this case, the recess 10 is formed in a depth not less than the thickness of the overhang 80, which allows the overhang 80 to be held completely in the recess 10 so that the overhang 80 does not extend off the reflection surface 71. This minimizes the possibility that a gap might occur between the light guide plate 1 and the reflection sheet 4. It also prevents propagating light that does not enter the light incident surface 6 of the light guide plate 1, of light emitted from each point light source 2, from entering the gap between the light guide plate 1 and the optical sheet 3, which prevents degradation in display quality.

Further, the flat light source 205 can be formed thinner since the overhang 80 does not extend off the reflection surface 71.

The recess 10 may be provided continuously in the direction that the light incident surface 6 extends to which the point light sources 2 are to be attached, or it may be provided locally on the reflection surface 71 at positions corresponding to prescribed mounting positions of the light incident surface 6 at which the point light sources 2 are to be attached.

B. Second Preferred Embodiment

B-1. Device Construction

A flat light source 200A according to a second preferred embodiment of the present invention will be described with reference to FIGS. 11 and 12.

Since the flat light source 200A has basically similar construction to the flat light source 200 described with reference to FIG. 2, similar components to the flat light source 200 shown in FIG. 2 will be omitted from illustration, and repeated description thereof will be omitted. FIG. 11 shows part of the light guide plate 1 of the flat light source 200A.

Figure 11:
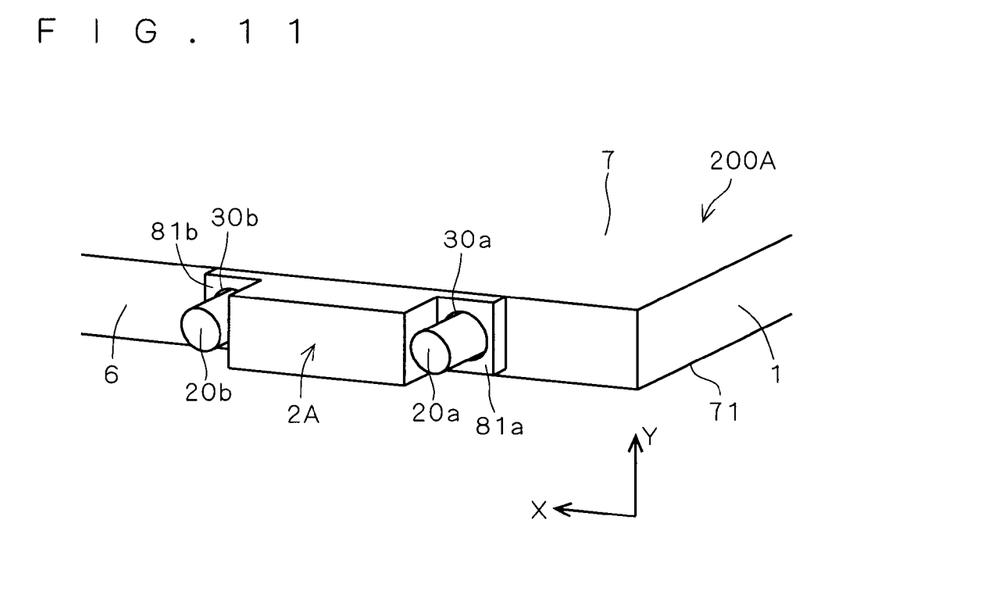
FIG. 11 is a partial perspective view showing the construction of a flat light source according to a second preferred embodiment of the invention.

FIG. 11 is a perspective view showing the construction of and around a flat light source 2A when viewing the light guide plate 1 from the side of the light incident surface 6. As shown in the drawing, the light incident surface 6 of the light guide plate 1 is provided with cylindrical projections 20a and 20b projecting perpendicularly from the light incident surface 6 and being spaced in the direction that the light incident surface 6 extends.

Figure 12:
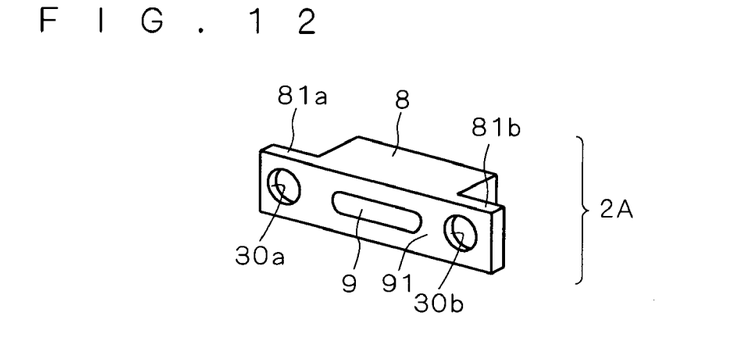
FIG. 12 is a perspective view showing the construction of a point light source of the flat light source according to the second preferred embodiment.

FIG. 12 is a perspective view showing the construction of the point light source 2A. As shown in the drawing, the point light source 2A has an LED stored in a block-like body 8 with a light emitting part 9 of the LED exposed at one surface of the body 8. This one surface will be called the light emitting surface 91.

Plate-like pieces 81a and 81b project from a pair of two sides of the light emitting surface 91, respectively, to extend in parallel to the light emitting surface 91. The two sides of the light emitting surface 91 from which the pieces 81a and 81b project will be called the left and right sides of the light emitting surface 91, respectively. Herein, since the body 8 and the pieces 81a and 81b are formed integrally, the material of the pieces 81a and 81b is determined by the material of the body 8.

As shown in FIG. 11, the pieces 81a and 81b come into contact with the light incident surface 6 when attaching each point light source 2A such that the light emitting surface 91 faces the light incident surface 6 of the light guide plate 1.

The pieces 81a and 81b are provided with through holes 30a and 30b extending through the pieces 81a and 81b, respectively, in the direction of their thickness. The point light source 2A is attached to the light incident surface 6 such that the projections 20a and 20b are inserted into the through holes 30a and 30b, respectively.

The through holes 30a and 30b have a diameter substantially equal to or slightly larger than the diameter of the projections 20a and 20b, respectively. Accordingly, inserting the projections 20a and 20b into the through holes 30a and 30b, respectively, the point light source 2A can be secured to the light incident surface 6. This facilitates attaching the point light source 2A to the light incident surface 6 without causing a displacement of the point light source 2A.

The projections 20a and 20b provided for the light guide plate 1 are not limited to cylindrical shape. The through holes 30a and 30b provided in the pieces 81a and 81b of the point light source 2A are not limited to cylindrical shape, but may be determined in accordance with the shape of the projections 20a and 20b.

B-2. Effects

In the above-described flat light source 200A according to the second preferred embodiment, the point light source 2A is secured to the light incident surface 6 by inserting the projections 20a and 20b provided on the light incident surface 6 of the light guide plate 1 into the through holes 30a and 30b provided in the pieces 81a and 81b of the point light source 2A, respectively. The flat light source 200A facilitates positioning of the point light source 2A while preventing a displacement of the point light source 2A from the light guide plate 1, which achieves easy construction.

Securing the point light source 2A to the light incident surface 6 prevents a displacement of the point light source 2A from the light guide plate 1 due to warpage of the light guide plate 1, if any, and allows effective use of light emitted from the point light source 2A to prevent degradation in luminance of the flat light source 200A and fluctuations in luminance in the light outgoing surface 7.

B-3. First Variant

In the above-described flat light source 200A according to the second preferred embodiment, each point light source 2A is secured by inserting the projections 20a and 20b provided on the light incident surface 6 of the light guide plate 1 into the through holes 30a and 30b provided in the pieces 81a and 81b of the point light source 2A, respectively. Since the plurality of point light sources 2A as mounted on an FPC are arranged along the light incident surface 6 of the light guide plate 1 as described earlier, a displacement of the point light sources 2A is limited to a certain degree.

Accordingly, a displacement may be prevented with simpler construction than using the projections 20a and 20b as in the flat light source 200A for completely securing the point light sources.

Figure 13:
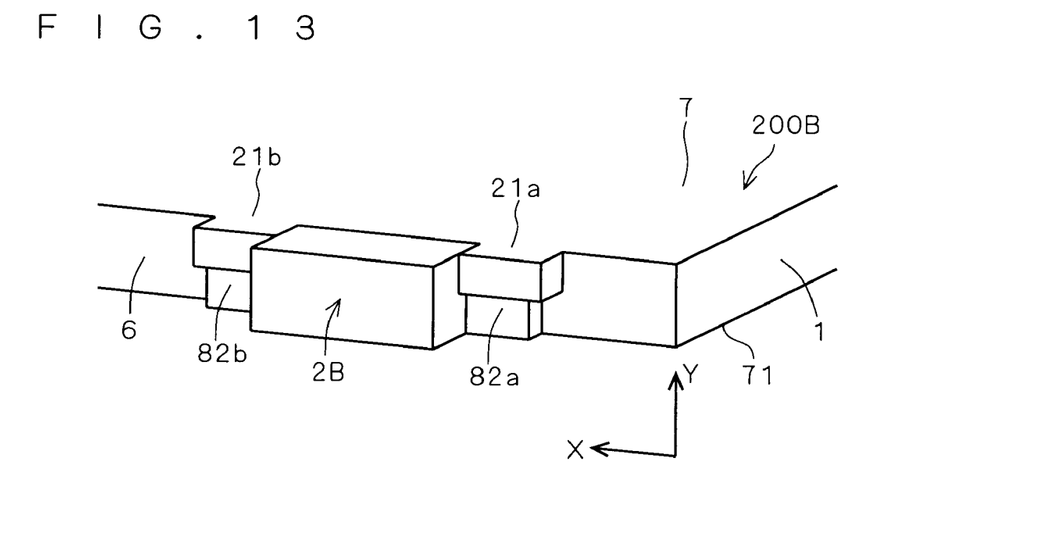
FIG. 13 is a partial perspective view showing the construction of a flat light source according to a first variant of the second preferred embodiment.

For instance, as in a flat light source 200B shown in FIG. 13, each point light source 2B may be sandwiched between block-like projections 21a and 21b so as not to be displaced in the direction that the light incident surface 6 extends (in the direction X).

More specifically, FIG. 13 is a perspective view showing the construction of and around the point light source 2B when viewing the light guide plate 1 from the side of the light incident surface 6. As shown in the drawing, the light incident surface 6 of the light guide plate 1 is provided with the block-like projections 21a and 21b projecting perpendicularly from the light incident surface 6 and being spaced in the direction that the light incident surface 6 extends. The projections 21a and 21b are formed on the light incident surface 6 closer to the light outgoing surface 7—that is, closer to the upper side of the light guide plate 1 in its thickness.

Figure 14:
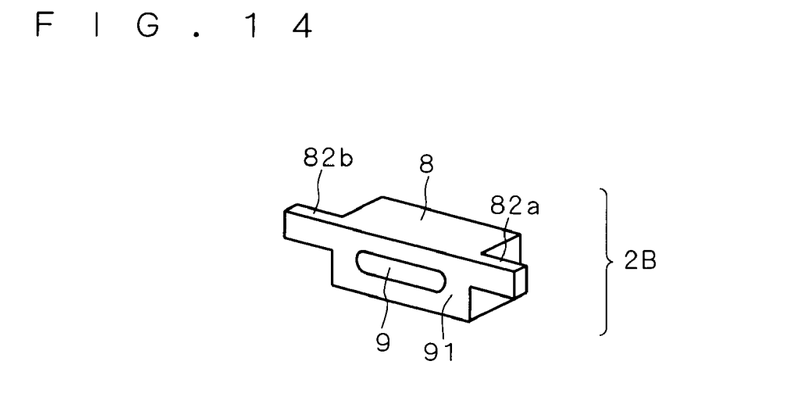
FIG. 14 is a perspective view showing the construction of a point light source of the flat light source according to the first variant of the second preferred embodiment.

FIG. 14 is a perspective view showing the construction of the point light source 2B. As shown in the drawing, the point light source 2B has an LED stored in a block-like body 8 with a light emitting part 9 of the LED exposed at one surface of the body 8. This one surface will be called the light emitting surface 91.

Plate-like pieces 82a and 82b project from a pair of sides of the light emitting surface 91, respectively, and extend in parallel to the light emitting surface 91. The two sides of the light emitting surface 91 from which the pieces 82a and 82b project will be called the right and left sides of the light emitting surface 91, respectively. Herein, since the body 8 and the pieces 82a and 82b are formed integrally, the material of the pieces 82a and 82b is determined by the material of the body 8.

The pieces 82a and 82b project from part of and the same position of the right and left sides of the light emitting surface 91, respectively, As shown in FIG. 13, when attaching the point light source 2B such that the light emitting surface 91 faces the light incident surface 6 of the light guide plate 1, the body 8 is sandwiched between the projections 21a and 21b, which prevents a displacement of the point light source 2B in the direction X, while the side surfaces of the projections 82a and 82b come into contact with the side surfaces of the projections 21a and 21b, respectively, which prevents an upward displacement of the point light source 2B in the direction of thickness of the light guide plate 1 (in the direction Y).

The projections 21a and 21b are arranged at a distance slightly greater than the width of the body 8 of the point light source 2B so as to prevent the body 8 and projections 21a and 21b from rubbing strongly against each other when attaching the point light source 2B, which achieves attachment with no foreign matter generated and easier construction.

B-4. Second Variant

Figure 15:
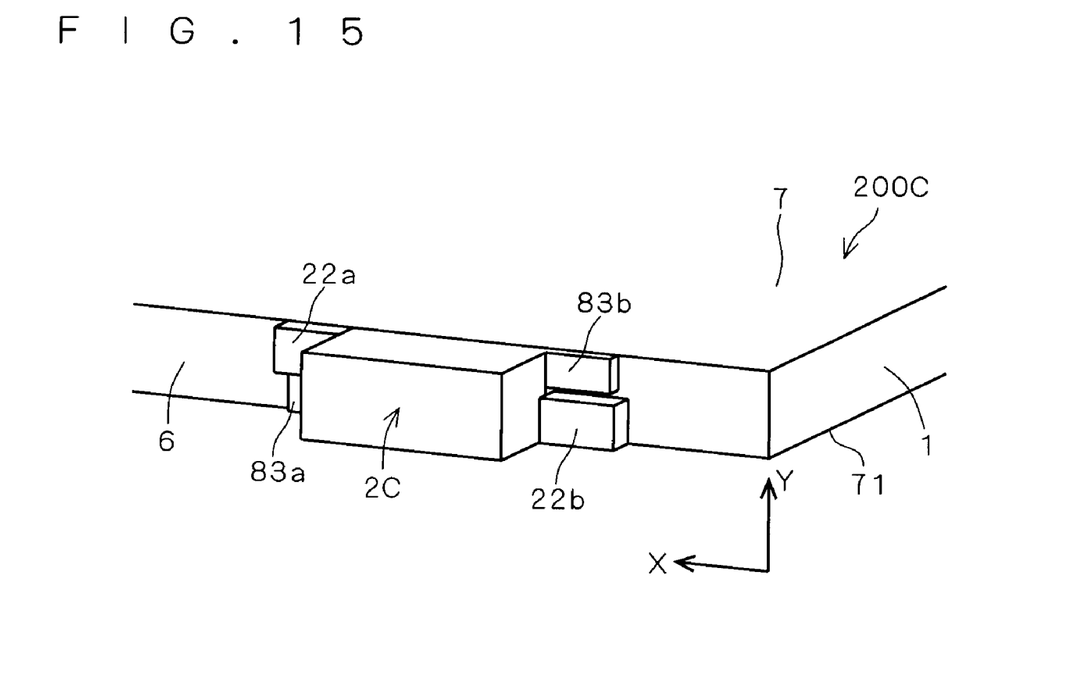
FIG. 15 is a partial perspective view showing the construction of the flat light source according to a second variant of the second preferred embodiment.

To effectively prevent a displacement with simple construction without completely securing the point light sources, each point light source 2C may be sandwiched between block-like projections 22a and 22b, as in a flat light source 200C shown in FIG. 15, so as not to be displaced in the direction that the light incident surface 6 extends (in the direction X).

More specifically, FIG. 15 is a perspective view showing the construction of and around the point light source 2C when viewing the light guide plate 1 from the side of the light incident surface 6. As shown in the drawing, the light incident surface 6 of the light guide plate 1 is provided with block-like projections 22a and 22b perpendicularly projecting from the light incident surface 6 and being spaced in the direction that the light incident surface 6 extends. The projection 22a is formed on the light incident surface 6 closer to the light outgoing surface 7 (that is, closer to the upper side of the light guide plate 1 in its thickness), while the projection 22b is formed on the light incident surface 6 closer to the reflection surface 71 (that is, closer to the lower side of the light guide plate 1 in its thickness). The projections 22a and 22b are staggered.

Figure 16:
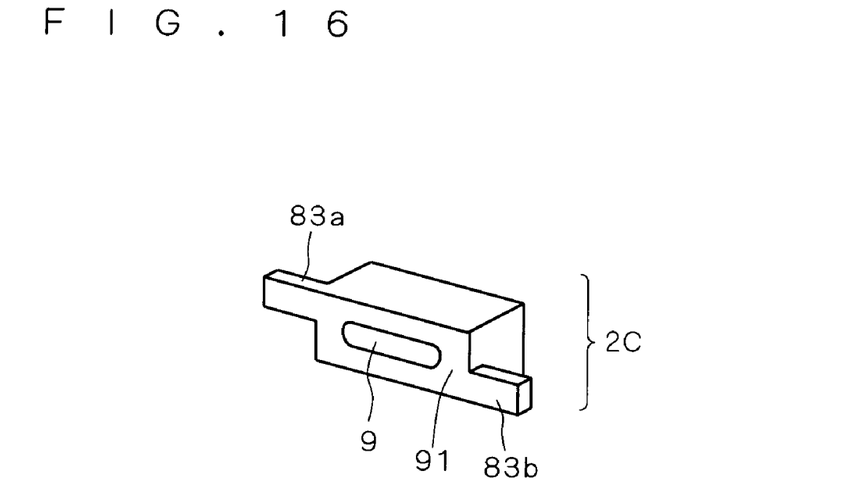
FIG. 16 is a perspective view showing the construction of a point light source of the flat light source according to the second variant of the second preferred embodiment.

FIG. 16 is a perspective view showing the construction of the point light source 2C. As shown in the drawing, the point light source 2C has an LED stored in a block-like body 8 with a light emitting part 9 of the LED exposed at one surface of the body 8. This one surface will be called the light emitting surface 91.

Plate-like pieces 83a and 83b project from a pair of sides of the light emitting surface 91, respectively, and extend in parallel to the light emitting surface 91. The two sides of the light emitting surface 91 from which the pieces 83a and 83b project will be called the left and right sides of the light emitting surface 91, respectively. Herein, since the body 8 and the pieces 83a and 83b are formed integrally, the material of the pieces 83a and 83b is determined by the material of the body 8.

The pieces 83a and 83b project from part of the left and right sides of the light emitting surface 91, respectively, in a staggered manner.

As shown in FIG. 15, when attaching the point light source 2C such that the light emitting surface 91 faces the light incident surface 6 of the light guide plate 1, the body 8 is sandwiched between the projections 22a and 22b, which prevents a displacement of the point light source 2C in the direction X, while the side surfaces of the projections 83a and 83b come into contact with the side surfaces of the projections 22a and 22b, respectively, which prevents upward and downward displacements of the point light source 2C in the direction of thickness of the light guide plate 1 (in the direction Y).

The projections 22a and 22b are arranged at a distance slightly greater than the width of the body 8 of the point light source 2C so as to prevent the body 8 and projections 22a and 22b from rubbing strongly against each other when attaching the point light source 2C, which achieves attachment with no foreign matter generated and easier construction.

While the invention has been shown and described in detail, the foregoing description is in all aspects illustrative and not restrictive. It is therefore understood that numerous modifications and variations can be devised without departing from the scope of the invention.

What is claimed is:

1. A flat light source comprising:
    a flat light guide plate having one main surface serving as a light outgoing surface from which light outgoes and the other main surface serving as a reflection surface opposite to said light outgoing surface; and
    a plurality of point light sources respectively separately provided at least on one side surface of said light guide plate,
    wherein
    said one side surface of said light guide plate on which said plurality of point light sources are provided serves as a light incident surface,
    each of said plurality of point light sources includes a block-like body with a light source stored therein, one surface of said body serving as a light emitting surface at which a light emitting part of said light source is exposed, each of said point light sources at least including a first overhang projecting from one side of said light emitting surface perpendicularly to said light emitting surface, and
    said first overhang has its main surface made in contact with one of said light outgoing surface and said reflection surface with said plurality of point light sources disposed such that said light emitting surface faces said light incident surface.

2. The flat light source according to claim 1, wherein
    each of said plurality of point light sources includes a second overhang projecting from a side paired with said one side of said light emitting surface from which said first overhang projects, said second overhang projecting perpendicularly to said light emitting surface, and
    said first overhang has its main surface made in contact with said light outgoing surface and said second overhang has its main surface made in contact with said reflection surface, with said plurality of point light sources disposed such that said light emitting surface faces said light incident surface.

3. The flat light source according to claim 2, wherein
    said light outgoing surface of said light guide plate includes a first recess reaching a depth equal to or greater than the thickness of said first overhang at least in a portion with which said main surface of said first overhang is in contact, and
    said reflection surface of said light guide plate includes a second recess reaching a depth equal to or greater than the thickness of said second overhang at least in a portion with which said main surface of said second overhang is in contact.

* * * * *